(12) United States Patent (10) Patent No.: US 8,369,639 B2
Yokose et al. (45) Date of Patent: Feb. 5, 2013

(54) IMAGE PROCESSING APPARATUS, COMPUTER READABLE MEDIUM STORING PROGRAM, METHOD AND COMPUTER DATA SIGNAL FOR PARTITIONING AND CONVERTING AN IMAGE

(75) Inventors: Taro Yokose, Ashigarakami-gun (JP); Tomoki Taniguchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 926 days.

(21) Appl. No.: 12/176,724

(22) Filed: Jul. 21, 2008

(65) Prior Publication Data

US 2009/0028429 A1 Jan. 29, 2009

(30) Foreign Application Priority Data

Jul. 24, 2007 (JP) ................................. 2007-191570

(51) Int. Cl.
*G06K 9/00* (2006.01)
(52) U.S. Cl. .......................... 382/251; 382/166; 382/239
(58) Field of Classification Search .................... None
See application file for complete search history.

(56) References Cited

U.S. PATENT DOCUMENTS

| | | | | |
|---|---|---|---|---|
| 5,220,440 A * | 6/1993 | Hisatake | ....................... | 382/239 |
| 5,414,527 A | 5/1995 | Koshi et al. | | |
| 7,729,426 B2 * | 6/2010 | Huang | ..................... | 375/240.29 |
| 7,830,553 B2 * | 11/2010 | Kakutani | ..................... | 358/3.14 |
| 2006/0215921 A1 * | 9/2006 | Yokose et al. | ................. | 382/238 |
| 2008/0317362 A1 * | 12/2008 | Hosaki et al. | ................. | 382/233 |
| 2009/0028454 A1 * | 1/2009 | Yokose | .......................... | 382/251 |
| 2009/0285479 A1 * | 11/2009 | Hosaki | .......................... | 382/166 |
| 2009/0303505 A1 * | 12/2009 | Yago | .............................. | 358/1.9 |

FOREIGN PATENT DOCUMENTS

| | | |
|---|---|---|
| JP | A-05-056282 | 3/1993 |
| JP | A-05-110869 | 4/1993 |
| JP | A-10-013690 | 1/1998 |
| JP | A-10-093816 | 4/1998 |
| JP | A-2002-010084 | 1/2002 |
| JP | A-2002-300412 | 10/2002 |
| JP | A-2006-287944 | 10/2006 |
| JP | A-2006-323870 | 11/2006 |
| JP | A-2007-060261 | 3/2007 |

OTHER PUBLICATIONS

Iwasaki, T., "Article image display system," machine translation of Japanese application 10-013690, Jan. 1998.*
Japanese Office Action issued in Japanese Patent Application No. 2007-191570 dated Oct. 28, 2010 (with translation).

* cited by examiner

*Primary Examiner* — Vu Le
*Assistant Examiner* — Xuemei Chen
(74) *Attorney, Agent, or Firm* — Oliff & Berridge, PLC

(57) ABSTRACT

An image processing apparatus includes a partitions setting unit that sets up image partitions into which an input image is separated; a tone number setting unit that sets the number of tones for each of the image partitions set up by the partitions setting unit, based on gray levels of pixels included in each of the image partitions; and a conversion unit that converts each of the image partitions of the input image into an image partition represented with tones equal to or less than the number of tones set by the tone number setting unit.

17 Claims, 9 Drawing Sheets

IMAGE PROCESSING PROGRAM 52

IMAGE PROCESSING PROGRAM 5

IMAGE PROCESSING PROGRAM 6

FIG. 5A

| 255 | 255 | 255 | 255 | 255 | 0 | 0 | 0 |
|-----|-----|-----|-----|-----|---|---|---|
| 170 | 128 | 128 | 174 | 174 | 128 | 128 | 0 |
| 170 | 128 | 128 | 174 | 174 | 128 | 128 | 0 |
| 170 | 128 | 128 | 174 | 174 | 128 | 128 | 0 |

FIG. 5B

| 255 | 255 | 255 | 255 | 194 | 0 | 0 | 0 |
|-----|-----|-----|-----|-----|---|---|---|
| 150 | 150 | 150 | 150 | 194 | 128 | 128 | 0 |
| 150 | 150 | 150 | 150 | 194 | 128 | 128 | 0 |
| 150 | 150 | 150 | 150 | 194 | 128 | 128 | 0 |

IMAGE PROCESSING PROGRAM 52

TARGET PIXEL X AND ITS SURROUNDING PIXELS $(X=B)$ or $(X=D)$ or $(X=E)$ or $(X=G)$

4 SURROUNDING PIXELS $(X=A)$ or $(X=B)$ or $(X=C)$ or $(X=D)$ or
$(X=E)$ or $(X=F)$ or $(X=G)$ or $(X=H)$

8 SURROUNDING PIXELS $\{(X=A) \text{ and }(X=B) \text{ and }(X=D)\}$ or
$\{(X=B) \text{ and }(X=C) \text{ and }(X=E)\}$ or
$\{(X=D) \text{ and }(X=F) \text{ and }(X=G)\}$ or
$\{(X=E) \text{ and }(X=G) \text{ and }(X=H)\}$

2 × 2 RECTANGLE

IMAGE PROCESSING PROGRAM 54

IMAGE PROCESSING PROGRAM 56

IMAGE PROCESSING APPARATUS, COMPUTER READABLE MEDIUM STORING PROGRAM, METHOD AND COMPUTER DATA SIGNAL FOR PARTITIONING AND CONVERTING AN IMAGE

CROSS-REFERENCE TO RELATED APPLICATIONS

This application is based on and claims priority under 35 USC 119 from Japanese Patent Application No. 2007-191570 filed Jul. 24, 2007.

BACKGROUND

Technical Field

The present invention relates to an image processing apparatus, a computer readable medium storing a program, a method and a computer data signal.

SUMMARY

An aspect of the invention resides in an image processing apparatus including a partitions setting unit that sets up image partitions into which an input image is separated; a tone number setting unit that sets the number of tones for each of the image partitions set up by the partitions setting unit, based on gray levels of pixels included in each of the image partitions; and a conversion unit that converts each of the image partitions of the input image into an image partition represented with tones equal to or less than the number of tones set by the tone number setting unit.

BRIEF DESCRIPTION OF THE DRAWINGS

Exemplary embodiments of the present invention will be described in detail based on the following figures, wherein:

FIG. 5A illustrates a CG image enlarged by nearest neighbor interpolation;

FIG. 5B illustrates a result after the CG image of FIG. 5A is evenly processed by color quantization;

DETAILED DESCRIPTION

Figure 1:
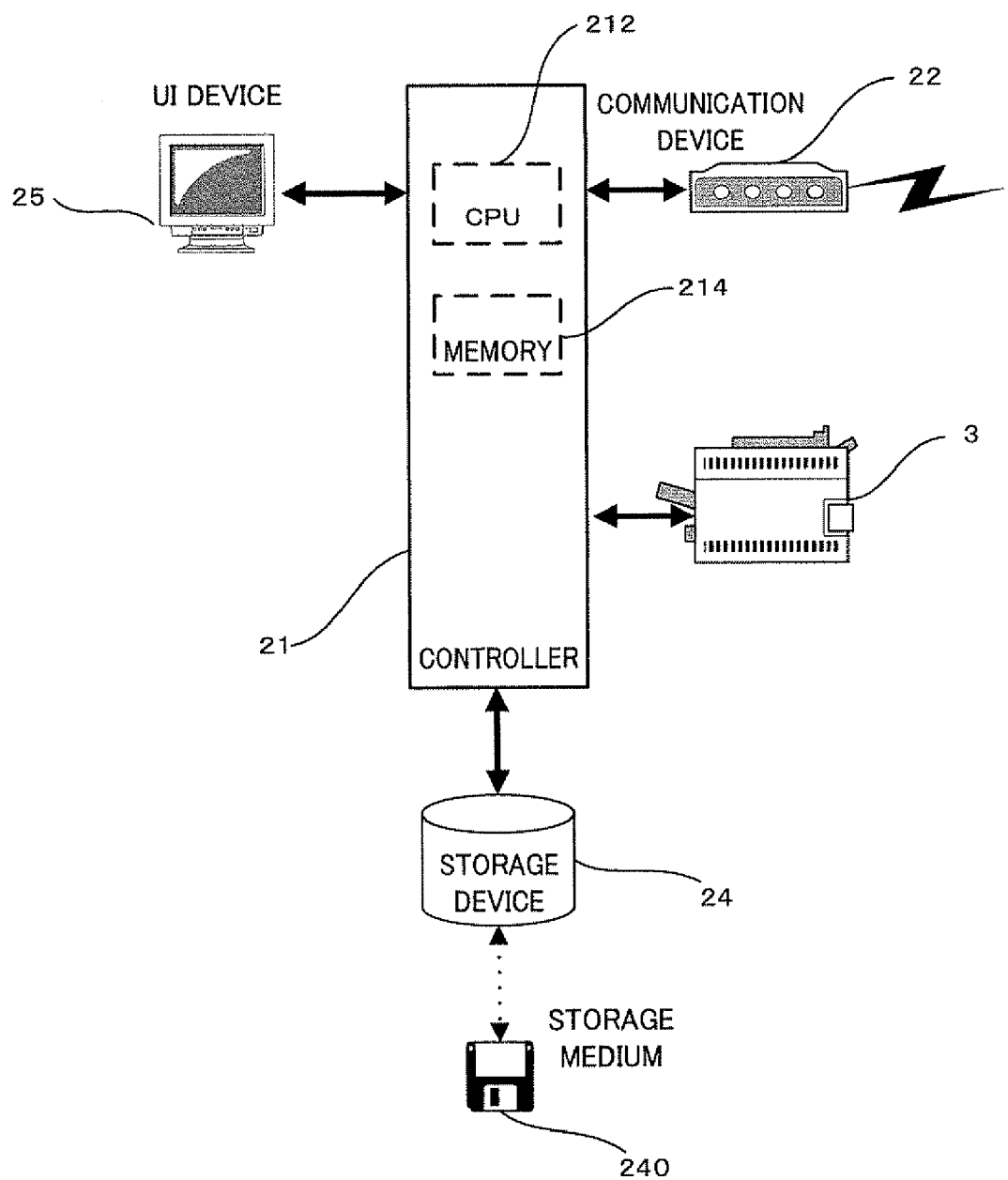
FIG. 1 illustrates a hardware structure of an image processing apparatus 2, wherein a controller 21 is shown in the center.

FIG. 1 illustrates a hardware structure of an image processing apparatus 2, wherein a controller 21 is shown in the center.

As illustrated in FIG. 1, the image processing apparatus is composed of the controller 21 including a CPU 212, a memory 214, and other components, a communication device 22, a storage device 24 such as HDD and CD, and a user interface device (UI device) 25 including an LCD or CRT display and a keyboard, touch panel, etc.

The image processing apparatus 2 is, for example, a general-purpose computer in which an image processing program 5 (which will be described later) has been installed. The image processing apparatus acquires image data via the communication device 22 or the storage device 24, encodes the acquired image data, and sends encoded image data to a printer 3.

Figure 2:
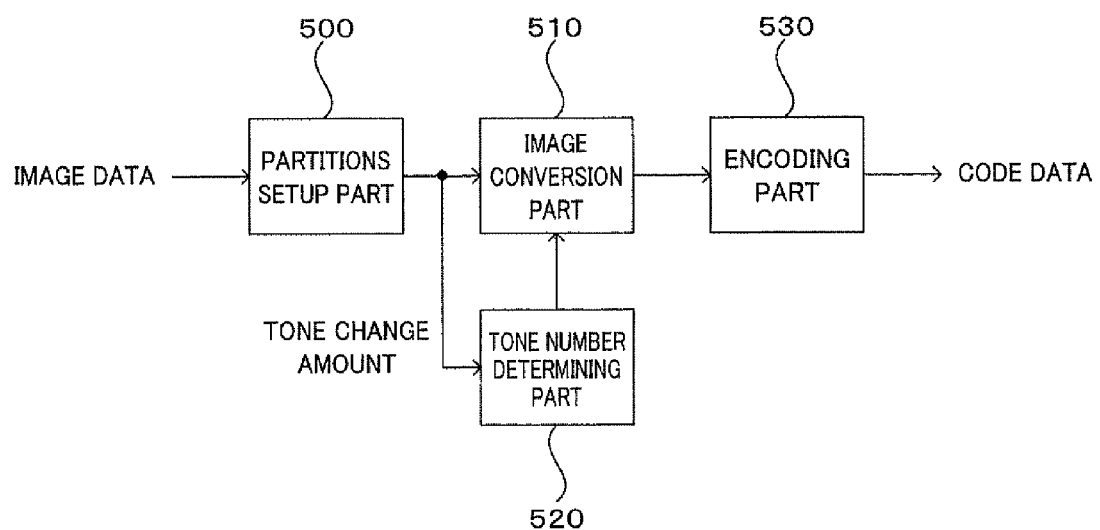
FIG. 2 illustrates an arrangement of functions of an image processing program 5 that is executed by the controller 21 (FIG. 1)

FIG. 2 illustrates an arrangement of functions of the image processing program 5 that is executed by the controller 21 (FIG. 1).

As illustrated in FIG. 2, the image processing program 5 includes a partitions setup part 500, an image conversion part 510, a tone number determining part 520, and an encoding part 530.

In the image processing program 5, the partitions setup part 500 acquires, via the communication device 22 or the storage device 24, rasterized image data and sets up image partitions (hereinafter referred to as blocks) of a fixed size into which the acquired image data is separated.

The partitions setup part 500 in this example sets up square partitions as blocks into which image data acquired is separated. Each partition is made up of 16 pixels, four pixels in a fast-scanning direction by four pixels in a slow-scanning direction in scanning order. The partitions setup part 500 outputs the values of the pixels per block to the image conversion part 510 and the tone number determining part 520.

The image conversion part 510 converts the image data for each of the blocks set up by the partitions setup part 500 into image data represented with tones equal to or less than the number of tones determined by the tone number determining part 520. In other words, the image conversion part 510 fills each block input to it with gray levels equal to or less than the number of tones determined by tone number determining part 520.

The image conversion part 510 in this example, if the number of tones for a target block (block to be processed) is 2, as determined by the tone number determining part 520, divides the values of the pixels in the block into two groups, based on a threshold value which is an average between the largest and smallest values across the block: i.e., one group of pixel values equal to or greater than the threshold value; and the other group of pixel values less than the threshold value. It fills pixels in each group with an average pixel value across the group. If the number of tones for the target block is 3, as determined by the tone number determining part 520, the image conversion part 510 divides the range (hereinafter referred to as a dynamic range) from the largest pixel value to the smallest pixel value in the block into three equal sections and fills the pixels falling in each section with an average pixel value across the part. In the case that the number of tones determined for the target block is 3, the image conversion part 510 may fill the pixels falling in the highest level section among the three equal sections of the dynamic range with the largest pixel value and the pixels falling in the lowest level section with the smallest pixel value. If doing so, the largest and smallest values in each block are preserved and dynamic range reduction by irreversible processing can be suppressed.

The tone number determining part 520 determines the upper limit number of tones for each of the blocks set up by the partitions setup part 500. For example, the tone number determining part 520 determines gray levels (the number of tones), based on gray levels (per pixel) of the pixels in each block. More specifically, the tone number determining part 520 determines gray levels (the number of tones), based on statistics (dispersion, entropy, histogram shape, etc.) on the gray levels of the pixels in each block. The tone number determining part 520 may determine the number of tones, based on edge intensity in each block or lossless code size per block.

The tone number determining part 520 in this example determines the number of tones to be 3 if the dynamic range (the extent between the largest and smallest gray levels) of the target block is equal to or more than a threshold Th and the number of tones to be 2 if the dynamic range is less than the threshold Th.

The encoding part 530 encodes image data passed from the image conversion part 510. Since color quantization (limiting the number of colors) is accomplished in the image conversion part 510, the encoding part 530 may apply a coding method that is compatible with color quantization (e.g., runlength coding, LZ coding).

Figure 3:
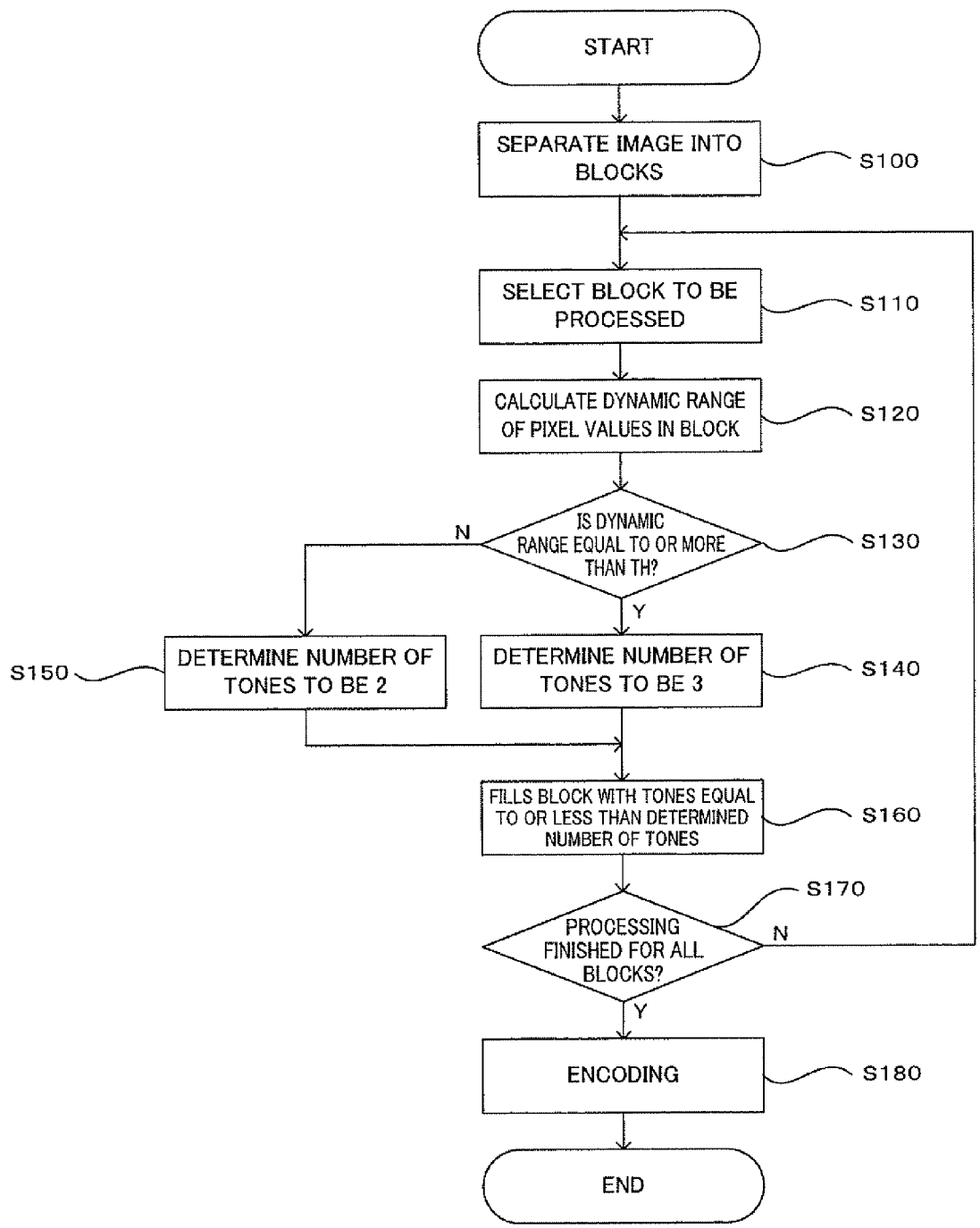
FIG. 3 is a flowchart illustrating the operation (S10) of the image processing program 5.

FIG. 3 is a flowchart illustrating the operation (S10) of the image processing program 5.

As illustrated in FIG. 3, at step 100 (S100), when image data is input, the partitions setup part 500 sets up blocks with a size of 4 pixels by 4 pixels into which the input image is separated.

At step 110 (S110), the partitions setup part 500 selects a target block in scanning order from among the blocks which have been set up and outputs the image data for the selected target block to the image conversion part 510 and the tone number determining part 520.

At step 120 (S120), the tone number determining part 520 calculates the dynamic range (i.e., a difference between the largest and smallest pixel values) of the target block, based on the image data for the target block passed from the partitions setup part 500.

At step 130 (S130), the tone number determining part 520 determines whether the calculated dynamic range is equal to or more than the threshold Th.

The image processing program 5 proceeds to step S140 if the dynamic range is equal to or more than the threshold Th or step S150 if the dynamic range is less than the threshold Th.

At step 140 (S140), the tone number determining part 520 determines the number of tones to be 3 and indicates the determined tone number of 3 to the image conversion part 510.

At step 150 (S150), the tone number determining part 520 determines the number of tones to be 2 and indicates the determined tone number of 2 to the image conversion part 510.

At step 160 (S160), the image conversion part 510 alters the values of the pixels in the target block, so that the image in the block is represented with tones equal to or less than the tone number indicated from the tone number determining part 520. In particular, if the tone number of 3 is indicated from the tone number determining part 520, the image conversion part 510 divides the dynamic range of the target block into three equal sections and replaces the values of the pixels falling in each section by an average pixel value across the section. If the tone number of 2 is indicated from the tone number determining part 520, the image conversion part 510 divides the dynamic range of the target block into two equal sections and replaces the values of the pixels falling in each section by an average pixel value across the section.

At step 170 (S170), the image processing program 5 determines whether processing in the steps 120 to 160 has been finished for all blocks. If at least one block remains unprocessed, the process returns to step S110 and selects the next target block. If no block remains unprocessed, the process proceeds to step S180.

At step 180 (S180), the encoding part 530 encodes the image data passed from the image conversion part 510 and outputs code data to the outside.

Figure 4:
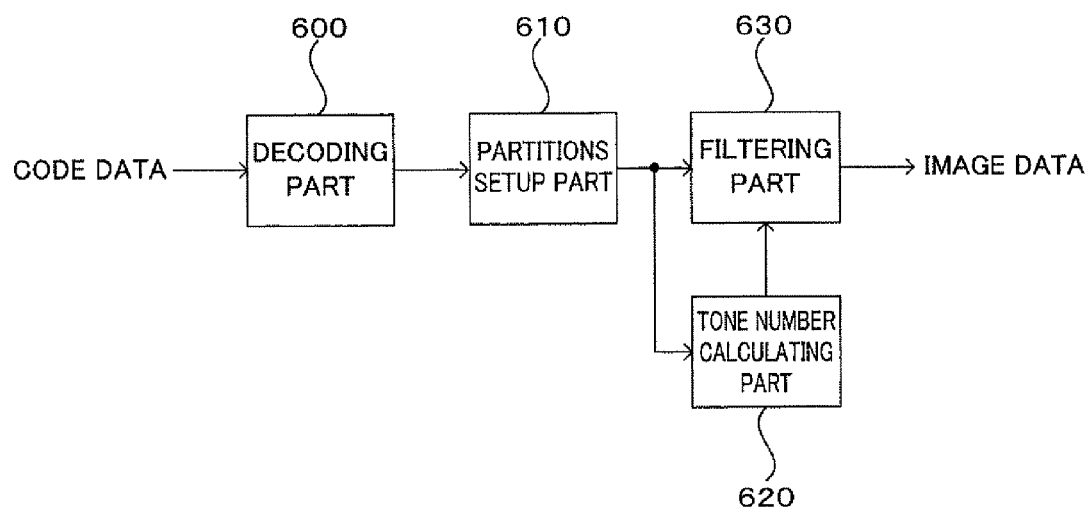
FIG. 4 illustrates an arrangement of functions of a second image processing program 6 for decoding code data generated by the above processing (S10)

FIG. 4 illustrates an arrangement of functions a second image processing program 6 for decoding code data generated by the above processing (S10).

As illustrated in FIG. 4, the second image processing program 6 includes a decoding part 600, a partitions setup part 610, a tone number calculating part 620, and filtering part 630.

In the image processing program 6, the decoding part 600 decodes input code data and outputs decoded image data to the partitions setup part 610.

The partitions setup part 610 sets up blocks of a fixed size into which image data passed from the decoding part 600 is separated. The partitions setup part 610 in this example sets up blocks having the same size as the blocks set up by the partitions setup part 500.

The tone number calculating part 620 calculates the number of gray levels (the number of tones) of the pixels in each block and outputs the calculated number of tones to the filtering part 630. The tone number calculating part 620 may calculate the dynamic range of each block instead of the number of tones or the dynamic range per block along with the number of tones.

The filtering part 630 selects a low-pass filter according to the number of tones per block calculated by the tone number calculating part 620 and filters the image data per block with the selected low-pass filter. In principle, the low-pass filtering effect may be increased as the number of tones decreases so as to inhibit the filtering if the number of tones equals to or more than a criterion value.

The filtering part 630 in this example applies the low-pass filter only if the number of tones of the target block is 1. If the number of tones of the target block is 2 and above, the filtering part 630 outputs the input image data as is without filtering.

The filtering part 630 may be controlled not to filter a certain block which has a possibility that low-pass filtering results in the dynamic range of pixel values in the block exceeding the threshold. This is because this situation may arise near an edge.

The filtering part 630 may be adapted to control the tap length of a low-pass filter depending on the number of tones per block. If the number of tones is large and the dynamic range is wide, it is likely that a high-frequency component is included in the image data; in such case, a shorter low-pass filter is considered to be appropriate.

The filtering part 630 may use a frequency filter other than the low-pass filter. For instance, for a block with a wide dynamic range, the filtering part 630 emphasizes a high-frequency portion or contrast. This can improve image quality.

Although, in this example, the number of tones per block is calculated from input image information (code data), additional information about dynamic range or tone number may be added to a header or the like of the image data when an input image is generated. Doing so can dispense with the process of calculating the number of tones.

As explained above, the image processing apparatus 2 of the present exemplary embodiment increases the encoding efficiency by performing color quantization per block by the image processing program 5 and suppresses image degradation due to color quantization by the second image processing program 6.

MODIFICATION EXAMPLE 1

A first example of modification to the foregoing exemplary embodiment is described.

While filling a subset of pixels in a block evenly with a tone is performed in the foregoing exemplary embodiment, certain pixels are excluded from filling with a tone in the first modification example.

For example, an image generated by a computer is often enlarged, when a photograph is pasted to it. To do this, nearest neighbor interpolation is often used in terms of processing speed.

FIG. 5A illustrates a CG image enlarged by nearest neighbor interpolation and FIG. 5B illustrates an image result after the CG image of FIG. 5A is processed by the foregoing exemplary embodiment.

In the CG image enlarged by nearest neighbor interpolation, as illustrated in FIG. 5A, there are rectangular blocks in which plural pixels forming a block have an equal pixel value. The size of these rectangular blocks is determined by an enlargement factor and, generally, blocks with different sizes are repeated cyclically. They are relatively easy to compress, because of low entropy.

However, in the foregoing exemplary embodiment, because such an image is not recognized, the image is processed in blocks with a different size and phase. In consequence, such a phenomenon may arise that the pixel values change and image degradation occurs, whereas compressibility is not improved, as can be seen from comparison between FIG. 5A and FIG. 5B.

Accordingly, in the first modification example, if, in four or eight pixels around a pixel, any pixel has the same value as the value of the pixel, the pixel is excluded from filling with a tone and the pixel value is stored. Thereby, rectangular blocks in the original image are preserved and image quality is improved. To avoid incorrect detection, pixels with equal values in a rectangular block may be detected, not only in surrounding pixels.

Figure 6:
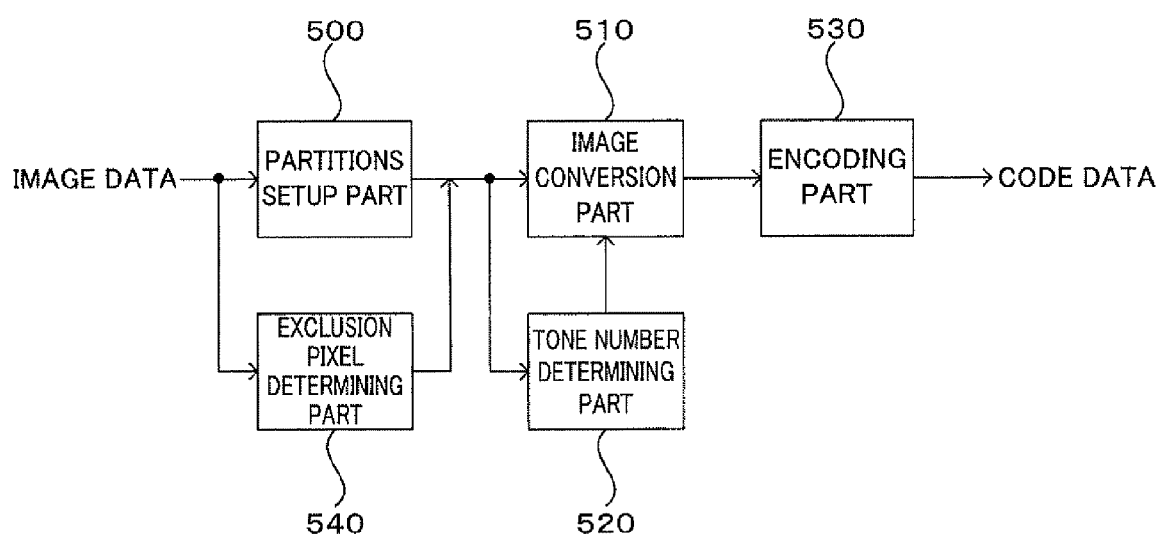
FIG. 6 illustrates an arrangement of functions of a third image processing program 52.

FIG. 6 illustrates an arrangement of functions of a third image processing program 52. Components shown in FIG. 6 that are substantially the same as those shown in FIG. 2 are assigned the same reference numbers.

As illustrated in FIG. 6, the third image processing program 52 is configured by adding an exclusion pixel determining part 540 to the image processing program 5 shown in FIG. 2.

The exclusion pixel determining part 540 compares plural pixels and determines a pixel to be excluded (hereinafter referred to as an exclusion pixel) from processing of the image conversion part 510. More specifically, the exclusion pixel determining part 540 determines whether a target pixel and its adjacent pixel fulfill a certain condition. If a certain condition is fulfilled, the target pixel is determined as an exclusion pixel. A certain condition is compatible with encoding by the encoding part 530 and it means a relationship that is easy to encode by the encoding.

FIGS. 7A to 7D illustrate conditions for determining an exclusion pixel.

Figure 7A:
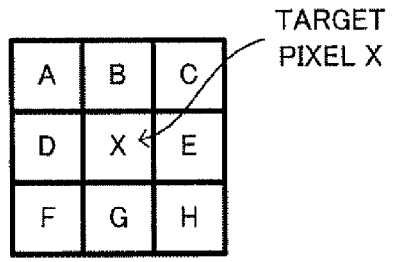
FIGS. 7A to 7D illustrate conditions for determining an exclusion pixel.

The exclusion pixel determining part 540 compares a target pixel X with any of surrounding pixels A to H around the target pixel X, as illustrated in FIG. 7A. Thus, if the target pixel X is present in a position other than the center of a block, pixels in another block may be surrounding pixels.

Figure 7B:
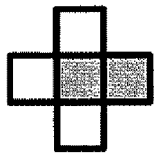

If the value of the target pixel X equals the value of any of surrounding pixels B, D, E, and G, as illustrated in FIG. 7B, the exclusion pixel determining part 540 in this example determines the target pixel X as an exclusion pixel and sets a flag indicating the exclusion.

Figure 7C:
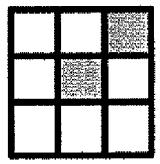
Figure 7D:
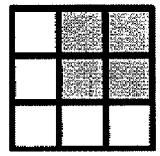

Alternatively, if the value of the target pixel X equals the value of any of eight surrounding pixels (A to H), as illustrated in FIG. 7C, the exclusion pixel determining part 540 may determine the target pixel X as an exclusion pixel. Alternatively, if 2×2 pixels including the target pixel X have equal pixel values, as illustrated in FIG. 7D, the target pixel X may be determined as an exclusion pixel.

In this modification example, the image conversion part 510 carries out color quantization, excluding pixels determined as exclusion pixels by the exclusion pixel determining part 540. The tone number determining part 520 calculates the dynamic range of pixel values in a block and determines the number of tones, excluding pixels determined as exclusion pixels by the exclusion pixel determining part 540.

MODIFICATION EXAMPLE 2

Next, a second modification example is described.

While the number of tones is determined according to the dynamic range of a block in the foregoing exemplary embodiment, the number of tones is determined according to the size of a block in the second modification example. That is, in this modification example, the size of a block set up by the partitions setup part 500 is variable and the number of tones is determined according to the size of a block set up.

Figure 8:
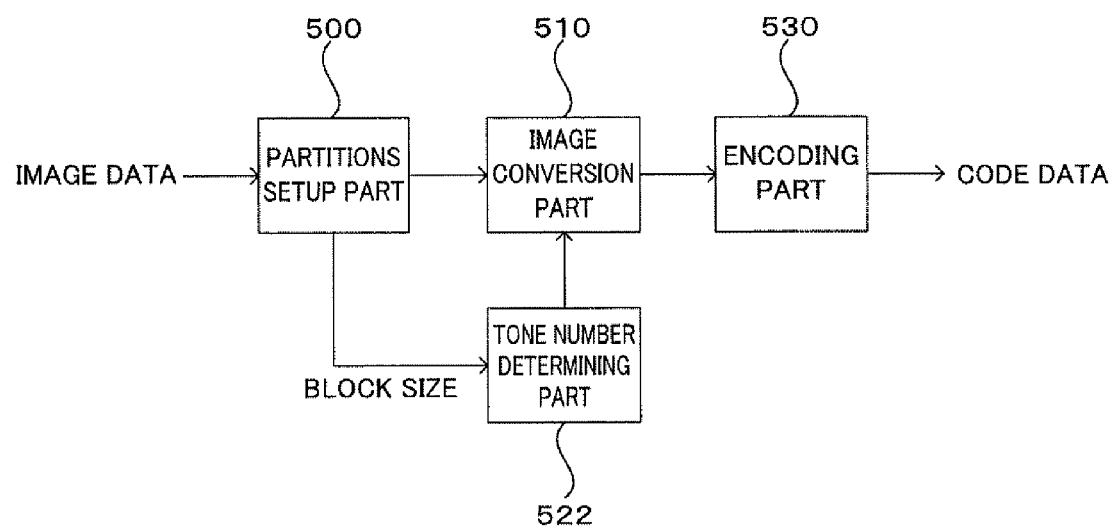
FIG. 8 illustrates an arrangement of functions of a fourth image processing program 54.

FIG. 8 illustrates an arrangement of functions of a fourth image processing program 54. Components shown in FIG. 8 that are substantially the same as those shown in FIG. 2 are assigned the same reference numbers.

As illustrated in FIG. 8, the fourth image processing program 54 is configured such that a second tone number determining part 522 supersedes the tone number determining part 520 of the image processing program 5 shown in FIG. 2.

The tone number determining part 522 changes the upper limit number of tones according to the size of a block set up by the partitions setup part 500. If the size of a block is small, there is no need to increase the number of tones, because change in pixel values is hard to perceive visually. So, the tone number determining part 522 controls the number of tones to increase the number of levels, as the block size becomes larger.

The partitions setup part 500 changes the block size according to intended compressibility. The partitions setup part 500 may set up a block size based on a parameter other than intended compressibility, for example, based on statistics (dispersion, entropy, etc.) on the gray levels of the pixels in each block, intended image quality, and user selection.

OTHER MODIFICATION EXAMPLES

Figure 9:
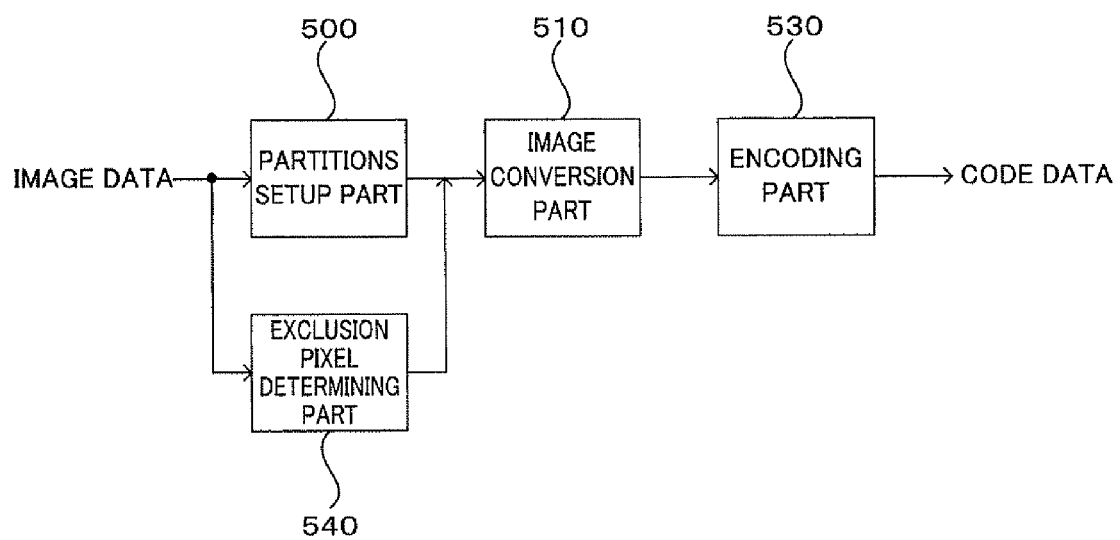
FIG. 9 illustrates an arrangement of functions of a fifth image processing program 56.

The tone number determining part 520 may be dispensed with and the number of pixels per block may be fixed, as illustrated in FIG. 9. That is, in this modification example, the image conversion part 510 carries out color quantization (filling with a tone), excluding exclusion pixels determined by the exclusion pixel determining part 540. In this case, the values of exclusion pixels are stored and, therefore, image degradation due to color quantization is suppressed.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image processing apparatus comprising:
a partitions setting unit that sets up image partitions into which an input image is separated, the input image including pixels;
an exclusion pixel determining unit that determines a given pixel to be excluded from setting a number of tones and conversion based upon a predetermined exclusion condition regarding pixel value distribution pattern;
a tone number setting unit that sets the number of tones for each of the image partitions set up by the partitions setting unit, based on the gray levels of pixels included in each of the image partitions with the exception of the excluded pixels determined by the determining unit;
a conversion unit that converts pixels included in each of the image partitions set up by the partitions setting unit with the exception of the excluded pixels determined by the exclusion pixel determining unit into pixels with tones equal to or less than the number of tones set by the tone number setting unit; and
an encoding unit that encodes excluded pixels determined by the exclusion pixel determining unit and pixels converted by the converting unit.

2. The image processing apparatus according to claim 1, wherein the tone number setting unit sets the number of tones for each of the image partitions, based on a range of the gray levels of pixels included in each of the image partitions.

3. An image processing apparatus comprising:
a partitions setting unit that sets up image partitions into which an input image is separated, the input image including pixels;
an exclusion pixel determining unit that determines a given pixel to be excluded from setting a number of tones and conversion based upon a predetermined exclusion condition regarding pixel value distribution pattern;
a tone number setting unit that sets the number of tones for each of the image partitions set up by the partitions setting unit, according to a size of an image partition set up by the partitions setting unit with the exception of the excluded pixels determined by the determining unit;
a conversion unit that converts pixels included in each of the image partitions set up by the partitions setting unit with the exception of the excluded pixels determined by the exclusion pixel determining unit into pixels with tones equal to or less than the number of tones set by the tone number setting unit; and
an encoding unit that encodes excluded pixels determined by the exclusion pixel determining unit and pixels converted by the converting unit.

4. The image processing apparatus according to claim 3, wherein the exclusion pixel determining unit compares a plurality of pixels and determines a pixel to be excluded from conversion processing by the conversion unit, and
wherein the conversion unit fills pixels included in each of the image partitions with the exception of a pixel determined to be excluded by the exclusion pixel determining unit with gray levels equal to or less than the number of tones set for each of the image partitions.

5. The image processing apparatus according to claim 3, wherein the encoding unit encodes an image converted by the conversion unit, and
the exclusion pixel determining unit compares a plurality of pixels, determines whether the pixels fulfill a condition compatible with encoding processing by the encoding unit, and determines a pixel fulfilling the condition as a pixel to be excluded.

6. The image processing apparatus according to claim 1, wherein the exclusion pixel determining unit determines a pixel to be protected, based on coding efficiency of a predetermined coding method.

7. A non-transitory computer readable medium storing a program causing a computer to execute a process for image processing, the process comprising:
setting up image partitions into which an input image is separated, the input image including pixels;
determining a given pixel to be excluded from setting a number of tones and conversion based upon a predetermined exclusion condition regarding pixel value distribution pattern;
setting the number of tones for each of the image partitions, based on the gray levels of pixels included in each of the image partitions with the exception of the pixels determined to be excluded;
converting pixels included in each of the image partitions set up with the exception of the excluded pixels determined to be excluded into pixels with tones equal to or less than the set number of tones; and
encoding the pixels determined to be excluded and pixels included in each of the converted image partitions.

8. A non-transitory computer readable medium storing a program causing a computer to execute a process for image processing, the process comprising:
setting up image partitions into which an input image is separated, the input image including pixels;
determining a given pixel to be excluded from setting a number of tones and conversion based upon a predetermined exclusion condition regarding pixel value distribution pattern;
setting the number of tones for each of the image partitions, according to a size of the image partition with the exception of the pixels determined to be excluded;
converting pixels included in each of the image partitions set up with the exception of the excluded pixels determined to be excluded into pixels with tones equal to or less than the set number of tones; and
encoding the pixels determined to be excluded and pixels included in each of the converted image partitions.

9. An image processing method comprising:
setting up image partitions into which an input image is separated, the input image including pixels;
determining a given pixel to be excluded from setting a number of tones and conversion based upon a predetermined exclusion condition regarding pixel value distribution pattern;
setting the number of tones for each of the image partitions, based on the gray levels of pixels included in each of the image partitions with the exception of the pixels determined to be excluded;
converting pixels included in each of the image partitions set up with the exception of the excluded pixels determined to be excluded into pixels with tones equal to or less than the number of tones; and
encoding the pixels determined to be excluded and pixels included in each of the converted image partitions.

10. An image processing method comprising:
setting up image partitions into which an input image is separated, the input image including pixels;

determining a given pixel to be excluded from setting a number of tones and conversion based upon a predetermined exclusion condition regarding pixel value distribution pattern;

setting the number of tones for each of the image partitions, according to a size of an image partition;

converting pixels included in each of the image partitions set up with the exception of the excluded pixels determined to be excluded into pixels with tones equal to or less than the number of tones; and encoding the pixels determined to be excluded and pixels included in each of the converted image partitions.

11. The image processing apparatus according to claim 3, wherein the exclusion pixel determining unit that determines a pixel to be protected, based on coding efficiency of a predetermined coding method.

12. The image processing apparatus according to claim 1, wherein the predetermined exclusion condition is selected from the group consisting of:
   (i) determining if at least one pixel which is orthogonally neighboring the given pixel has a value equal to a value of the given pixel;
   (ii) determining if at least one pixel which is adjacently neighboring the given pixel has a value equal to a value of the given pixel; and
   (iii) determining if the given pixel is a member of a 2×2 group of pixels, each of the pixels in the 2×2 group of pixels having the same value.

13. The image processing apparatus according to claim 3, wherein the predetermined exclusion condition is selected from the group consisting of:
   (i) determining if at least one pixel which is orthogonally neighboring the given pixel has a value equal to a value of the given pixel;
   (ii) determining if at least one pixel which is adjacently neighboring the given pixel has a value equal to a value of the given pixel; and
   (iii) determining if the given pixel is a member of a 2×2 group of pixels, each of the pixels in the 2×2 group of pixels having the same value.

14. The process according to claim 7, wherein the predetermined exclusion condition is selected from the group consisting of:
   (i) determining if at least one pixel which is orthogonally neighboring the given pixel has a value equal to a value of the given pixel;
   (ii) determining if at least one pixel which is adjacently neighboring the given pixel has a value equal to a value of the given pixel; and
   (iii) determining if the given pixel is a member of a 2×2 group of pixels, each of the pixels in the 2×2 group of pixels having the same value.

15. The process according to claim 8, wherein the predetermined exclusion condition is selected from the group consisting of:
   (i) determining if at least one pixel which is orthogonally neighboring the given pixel has a value equal to a value of the given pixel;
   (ii) determining if at least one pixel which is adjacently neighboring the given pixel has a value equal to a value of the given pixel; and
   (iii) determining if the given pixel is a member of a 2×2 group of pixels, each of the pixels in the 2×2 group of pixels having the same value.

16. The image processing method according to claim 9, wherein the predetermined exclusion condition is selected from the group consisting of:
   (i) determining if at least one pixel which is orthogonally neighboring the given pixel has a value equal to a value of the given pixel;
   (ii) determining if at least one pixel which is adjacently neighboring the given pixel has a value equal to a value of the given pixel; and
   (iii) determining if the given pixel is a member of a 2×2 group of pixels, each of the pixels in the 2×2 group of pixels having the same value.

17. The image processing method according to claim 10, wherein the predetermined exclusion condition is selected from the group consisting of:
   (i) determining if at least one pixel which is orthogonally neighboring the given pixel has a value equal to a value of the given pixel;
   (ii) determining if at least one pixel which is adjacently neighboring the given pixel has a value equal to a value of the given pixel; and
   (iii) determining if the given pixel is a member of a 2×2 group of pixels, each of the pixels in the 2×2 group of pixels having the same value.

* * * * *